United States Patent
Shen et al.

(10) Patent No.: US 11,760,900 B2
(45) Date of Patent: Sep. 19, 2023

(54) CONDENSATION CURABLE COMPOSITION

(71) Applicant: Momentive Performance Materials Inc., Waterford, NY (US)

(72) Inventors: Hao Shen, Verona, NJ (US); Antonio Chaves, Chappaqua, NY (US); Amy Hua McKinstry, Danbury, CT (US); Monjit Phukan, West Harrison, NY (US)

(73) Assignee: Momentive Performance Materials Inc., Waterford, NY (US)

( * ) Notice: Subject to any disclaimer, the term of this patent is extended or adjusted under 35 U.S.C. 154(b) by 0 days.

(21) Appl. No.: 17/512,083

(22) Filed: Oct. 27, 2021

(65) Prior Publication Data

US 2023/0127458 A1   Apr. 27, 2023

(51) Int. Cl.
| | |
|---|---|
| *C09D 183/04* | (2006.01) |
| *C08F 230/08* | (2006.01) |
| *C08G 77/458* | (2006.01) |
| *C09D 183/10* | (2006.01) |
| *C08G 18/83* | (2006.01) |
| *C08G 65/336* | (2006.01) |

(52) U.S. Cl.
CPC .......... *C09D 183/04* (2013.01); *C08F 230/08* (2013.01); *C08G 77/458* (2013.01); *C09D 183/10* (2013.01); *C08G 18/837* (2013.01); *C08G 65/336* (2013.01)

(58) Field of Classification Search
CPC .. C09D 175/04; C09D 171/02; C09D 133/04; C08G 18/837; C08G 65/336; C08F 230/08; C08K 5/5475
See application file for complete search history.

(56) References Cited

U.S. PATENT DOCUMENTS

| | | |
|---|---|---|
| 4,483,973 A | 11/1984 | Lucas et al. |
| 4,499,234 A | 2/1985 | Pratt et al. |
| 4,542,174 A | 9/1985 | Godlewski |
| 4,554,338 A | 11/1985 | Wengrovius |
| 4,563,498 A | 1/1986 | Lucas |
| 4,618,653 A | 10/1986 | Kawakubo et al. |
| 5,213,899 A | 5/1993 | Lucas |
| 5,232,982 A | 8/1993 | Lucas |
| 5,420,196 A | 5/1995 | Lucas |
| 5,519,104 A | 5/1996 | Lucas |
| 6,811,823 B2 | 11/2004 | Boswell et al. |
| 7,569,653 B2 | 8/2009 | Landon |
| 8,138,297 B2 | 3/2012 | Huang et al. |
| 10,040,924 B2 | 8/2018 | Mizunashi et al. |
| 10,100,233 B2 | 10/2018 | Zajaczkowski et al. |
| 2013/0023602 A1 | 1/2013 | Dorman |
| 2014/0079887 A1 | 3/2014 | Dorman |
| 2015/0005443 A1* | 1/2015 | Byrne ............... C09J 201/10 525/437 |
| 2015/0232745 A1 | 8/2015 | Cho et al. |
| 2015/0291839 A1* | 10/2015 | O'Connor ......... C09D 175/04 428/447 |
| 2017/0210913 A1* | 7/2017 | Dubey .............. C09D 171/02 |
| 2020/0078705 A1 | 3/2020 | Darling et al. |
| 2020/0131775 A1 | 4/2020 | Tang et al. |
| 2020/0190358 A1 | 6/2020 | Joshi et al. |

FOREIGN PATENT DOCUMENTS

| | | |
|---|---|---|
| CN | 106634801 | 5/2017 |
| CN | 108424585 | 8/2018 |
| CN | 109021916 | 12/2018 |
| EP | 491483 A1 * | 6/1992 |
| MX | 327411 | 1/2015 |

OTHER PUBLICATIONS

Patent Cooperation Treaty (PCT), International Search Report and Written Opinion for Application PCT/2022/047787 filed Oct. 26, 2022, dated Jan. 31, 2023, International Searching Authority, EP.

* cited by examiner

*Primary Examiner* — Marc S Zimmer
(74) *Attorney, Agent, or Firm* — James C. Abruzzo; McDonald Hopkins LLC

(57) ABSTRACT

A moisture-curable composition is shown and described herein. The moisture-curable composition comprises a moisture-curable resin and a moisture scavenger selected from a cyanoalkylalkoxysilane. The inclusion of the cyanoalkylalkoxysilane in the moisture-curable composition has been found to effectively scavenge moisture and control the rate of curing and viscosity increase in the composition.

20 Claims, No Drawings

CONDENSATION CURABLE COMPOSITION

FIELD OF INVENTION

The present invention relates to a curable composition and particularly to condensation curable compositions. The compositions include a moisture scavenger to control the stability of the composition upon exposure to moisture.

BACKGROUND

Silane grafted polymers, resins, elastomers, adhesives, sealants, coatings, etc., often employ a moisture scavenger to stabilize these materials. In particular, moisture scavengers are typically included to provide a component with a higher reactivity toward water than the silane-grafted material to stabilize the composition and prevent the silane-grafted material from reacting too quickly and from reacting with water before use. This allows the material to have a longer shelf life, a longer pot life, and/or allows for better processing and application of the material. Alkoxysilanes such as vinyltrimethoxysilane, methyltrimethoxysilane, phenyltrimethoxysilane, and propyltrimethoxysilane, for example, have been used as moisture scavengers in moisture-curable polymer compositions. While generally suitable as moisture scavengers, these materials may not provide the desired level of performance required for certain applications and certain of these materials may have safety related concerns (toxicity, flammability, etc.) or face regulation that could limit their use in the future. For example, vinyltrimethoxysilane is potentially subject to regulation in some countries as a skin sensitizer, which may lead to more limited use of such materials in moisture-curable compositions.

SUMMARY

The following presents a summary of this disclosure to provide a basic understanding of some aspects. This summary is intended to neither identify key or critical elements nor define any limitations of embodiments or claims. Furthermore, this summary may provide a simplified overview of some aspects that may be described in greater detail in other portions of this disclosure.

In one aspect, provided is a moisture curable composition comprising a polymer that is reactive with water, such as a polymer comprising a hydrolysable silyl group, and a moisture scavenger selected from a cyanoalkylalkoxysilane. Applicant has surprisingly found that the cyanoalkylalkoxysilanes can function as a moisture scavenger material. These materials also exhibit relatively low toxicity and flammability, which make them suitable for use in many applications.

In another aspect, provided is a cured composition produced by contacting the moisture curable composition with water.

In still another aspect, provided is a moisture-curable sealant, adhesive, or coating containing the moisture-curable resin.

In still yet another embodiment provided is a method of treating a substrate comprising applying the present moisture-curable compositions to a surface of a substrate.

In one aspect, provided is a moisture-curable composition comprising: (a) a moisture-curable resin comprising a polymer that is reactive with water; and (b) a moisture scavenger selected from a cyanoalkylalkoxysilane.

In one embodiment, the cyanoalkylalkoxysilane is of the formula:

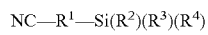

where $R^1$ is selected from a C1-C20 bivalent hydrocarbon group; $R^2$, $R^3$, and $R^4$ are each independently selected from C1-30 monovalent hydrocarbon, a halide, and $-OR^5$, where $R^5$ is independently selected from a C1-30 monovalent hydrocarbon, with the proviso that at least one of $R^2$, $R^3$, and $R^4$ is selected from $-OR^5$.

In one embodiment, $R^1$ is selected from a C1-C20 alkylene; $R^2$, $R^3$, and $R^4$ are each independently selected from a C1-C20 alkyl, a C4-C20 cycloalkyl, and a C6-C30 aryl; and $R^5$ is independently selected from a C1-C20 alkyl.

In one embodiment, $R^1$ is selected from a C1-C20 alkylene; each of $R^2$, $R^3$, and $R^4$ is selected from a C1-C10 alkyl, and $R^5$ is selected from a C1-C10 alkyl.

In one embodiment, $R^1$ is selected from a C1-C4 alkylene, and each of $R^2$, $R^3$, and $R^4$ is selected from $-OR^5$, where $R^5$ is independently selected from a C1-C4 alkyl.

In one embodiment of the moisture curable composition in accordance with any of the previous embodiments, the cyanoalkylalkoxysilane is selected from 2-cyanoethyltrimethoxysilane, 2-cyanoethyltriethoxysilane, 2-cyanoethyltripropoxysilane, 2-cyanoethyldimethoxymethylsilane, 2-cyanoethyldimethoxyethylsilane, 2-cyanoethyldiethoxymethylsilane, 2-cyanoethyldiethyoxyethylsilane, 3-cyanopropyltrimethoxysilane, 3-cyanopropyltriethoxysilane, 3-cyanopropyltripropoxysilane, 3-cyanopropyldimethoxymethylsilane, 3-cyanopropyldimethoxyethylsilane, 3-cyanodiethoxymethylsilane, 3-cyanopropyldiethoxyethylsilane, or a combination of two or more thereof.

In one embodiment of the moisture curable composition in accordance with any of the previous embodiments, the cyanoalkylsiloxane is present in an amount of from about 0.1 wt. % to about 20 wt. % based on the total weight of the moisture-curable resin (a).

In one embodiment of the moisture curable composition in accordance with any of the previous embodiments, the cyanoalkylsilane is present in an amount of from about 0.5 wt. % to about 10 wt. % based on the total weight of the moisture-curable resin (a).

In one embodiment of the moisture curable composition in accordance with any of the previous embodiments, the moisture curable resin comprises a hydrolysable silyl group.

In one embodiment of the moisture curable composition in accordance with any of the previous embodiments, the moisture-curable resin (a) is selected from a silylated polyol; a silylated polyether; a silylated polyurethane; a silane-containing copolymer derived from the copolymerization of an ethylenically unsaturated silane selected from a vinylsilane, an allylsilane, a methallylsilane, an acryloxyalkylsilane, a methacryloxyalkylsilane, and an ethylenically unsaturated monomer selected from an olefinic hydrocarbon, an acrylic acid, a methacrylic acid, an acrylate ester, a methacrylate ester, an ethylenically unsaturated dicarboxylic acid, and/or an anhydride of the ethylenically unsaturated monomer, oligomers, and/or a polymer possessing ethylenic unsaturation; a combination of two or more thereof.

In one embodiment of the moisture curable composition in accordance with any of the previous embodiments, the moisture-curable resin (a) is selected from a silylated polyurethane.

In one embodiment, the silylated polyurethane is selected from a polymer of the formula:

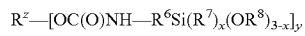

where $R^z$ is an organic polymer fragment, $R^6$ is an alkylene group of up to 12 carbon atoms, optionally containing one or more heteroatoms, each $R^7$ is the same or different alkyl or aryl group of up to 8 carbon atoms, each $R^8$ is the same or different alkyl group of up to 6 carbon atoms, x is 0, 1 or 2, and y is 1 to 6.

In one embodiment, $R^1$ is selected from a C1-C20 linear or branched bivalent hydrocarbon group; $R^2$, $R^3$, and $R^4$ are each independently selected from a C1-C10 alkyl; where $R^5$ is selected from a C1-C10 alkyl.

In one embodiment, each of $R^2$, $R^3$, and $R^4$ is selected from a C1-C20 alkyl, a C4-C20 cycloalkyl, a C6-C30 aryl, or $—OR^5$.

In one embodiment, $R^1$ is selected from a C1-C20 linear or branched bivalent hydrocarbon group, and each of $R^2$, $R^3$, and $R^4$ is selected from $—OR^5$, where $R^5$ is independently selected from a C1-C4 alkyl.

In one embodiment of the moisture curable composition in accordance with any of the previous embodiments, the composition further comprises an additive selected from a pigment, a filler, a curing catalyst, a dye, a plasticizer, a thickener, a coupling agent, an extender, a solvent, a wetting agent, a tackifiers, a crosslinking agent, a thermoplastic polymer, an adhesion promoter, a UV stabilizer, or a combination of two or more thereof.

In one embodiment of the moisture curable composition in accordance with any of the previous embodiments, the composition further comprises a catalyst that catalyzes the reaction of the moisture-curable resin (a) with water under curing conditions.

In another aspect, provided is a cured composition produced by contacting the moisture curable composition in accordance with any of the previous embodiments with water.

In still another aspect, provided is a moisture-curable sealant, adhesive or coating containing the moisture-curable resin composition in accordance with any of the previous embodiments.

In still yet another aspect, provide is a method of forming a cured composition comprising contacting the composition in accordance with any of the previous embodiments with water.

In yet another aspect, provided is a method of treating a substrate comprising applying a moisture-curable composition in accordance with any of the previous embodiments to a surface of the substrate.

The following description and the drawings disclose various illustrative aspects. Some improvements and novel aspects may be expressly identified, while others may be apparent from the description and drawings.

DETAILED DESCRIPTION

Reference will now be made to exemplary embodiments, examples of which are described in the following detailed description. It is to be understood that other embodiments may be utilized and structural and functional changes may be made. Moreover, features of the various embodiments may be combined or altered. As such, the following description is presented by way of illustration only and should not limit in any way the various alternatives and modifications that may be made to the illustrated embodiments. In this disclosure, numerous specific details provide a thorough understanding of the subject disclosure. It should be understood that aspects of this disclosure may be practiced with other embodiments not necessarily including all aspects described herein, etc.

As used herein, the words "example" and "exemplary" means an instance, or illustration. The words "example" or "exemplary" do not indicate a key or preferred aspect or embodiment. The word "or" is intended to be inclusive rather than exclusive, unless context suggests otherwise. As an example, the phrase "A employs B or C," includes any inclusive permutation (e.g., A employs B; A employs C; or A employs both B and C). As another matter, the articles "a" and "an" are generally intended to mean "one or more" unless context suggest otherwise.

The terms "polymer" and "resin" or "polymer resin" as used herein are used interchangeably with one another.

Values for the ranges of a respective component can be combined to form new and non-specified ranges.

Provided is a composition comprising (a) a moisture-curable polymer and (b) a moisture scavenger, where the moisture scavenger is selected from a (cyanoalkyl)alkoxysilane. The (cyanoalkyl)alkoxysilanes have been found to be excellent moisture scavengers and provide comparable or better scavenging of moisture compared to conventional moisture scavengers such as conventional alkoxysilanes. One indicator of the effectiveness of the moisture scavenger is on the viscosity of the composition upon exposure to moisture. Exposure to moisture in moisture-curable compositions results in cross-linking that increases the viscosity of the material. Suitable moisture scavengers have the effect of slowing down the increase in viscosity.

The moisture scavenger (b) is selected from a cyanoalkylalkoxysilane. In one embodiment, the cyanoalkylalkoxysilane is selected from a compound of the formula:

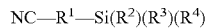

$$NC—R^1—Si(R^2)(R^3)(R^4)$$

where $R^1$ is selected from a C1-C20 bivalent hydrocarbon group; $R^2$, $R^3$, and $R^4$ are each independently selected from a C1-C30 monovalent hydrocarbon, a halide, and $—OR^5$, where $R^5$ is selected from a C1-C20 monovalent hydrocarbon, with the proviso that at least one of $R^2$, $R^3$, and $R^4$ is selected from halide or $—OR^5$.

The bivalent and monovalent hydrocarbons can be selected from linear, branched, or cyclic hydrocarbons. Branched hydrocarbons generally contain 3 or more carbon atoms. Cyclic hydrocarbons generally comprise 4 or more carbon atoms. The cyclic hydrocarbons may also include one or more unsaturated C—C bonds and, in embodiments, may include one or more aromatic. In one embodiment, the monovalent hydrocarbon is selected from an alkyl, a cycloalkyl, and an aryl. In one embodiment, the bivalent hydrocarbon is selected from an alkylene. The alkylene may include cycloalkylenes. The halide can be selected from chloride, bromide, or iodide.

In one embodiment, $R^1$ is selected from a C1-C20 alkylene; $R^2$, $R^3$, and $R^4$ are each independently selected C1-C20 alkyl, a C4-C20 cycloalkyl, a C6-C30 aryl; and $R^5$ is selected from a C1-C20 alkyl.

Cycloalkyls include a group with one or more cycloalkyl rings that may be separated by a bond, a linker group, or fused and optionally contain one or more groups (e.g., an alkyl, alcohol, etc.) attached to the ring. The aryl groups include groups with one or more aromatic rings, where groups with more than one ring may be joined by a bond, a linker group, or fused and can optionally contain one or more groups (e.g., an alkyl, alcohol, etc.) attached to the ring. The C6-C30 aryl groups can include, for example, C7-C30 arylalkyl groups and C7-C30 alkylaryl groups.

In one embodiment, $R^1$ is selected from a C1-C10 alkylene, a C2-C8 alkylene, or a C3-C6 alkylene; $R^2$, $R^3$, and $R^4$ are each independently selected from a C1-C10 alkyl, C3-C8 alkyl, a C4-C6 alkyl, and —OR$^5$, where R$^5$ is selected from a C1-C10 alkyl, a C2-C8 alkyl, or a C3-C6 alkyl. In one embodiment, R$^1$ is selected from a C2 alkylene; R$^2$, R$^3$, and R$^4$ are each a C1 alkyl; and R$^5$ is a C1 alkyl.

In one embodiment, R$^1$ is selected from a C1-C20 alkylene, and each of R$^2$, R$^3$, and R$^4$ is selected from —OR$^5$, where R$^5$ is independently selected from a C1-C20 alkyl, a C4-C20 cycloalkyl, and a C6-C30 aryl. In one embodiment, R1 is selected from a C2-C4 alkylene, and each of R$^2$, R$^3$, and R$^4$ is selected from —OR$^5$, where R$^5$ is independently selected from a C2-C4 alkyl.

Examples of suitable cyanoalkyl alkoxysilanes include, but are not limited to, cyanomethyltrimethoxysilane, cyanomethyltriethoxysilane, cyanomethyltripropoxysilane, 2-cyanoethyltrimethoxysilane, 2-cyanoethyltriethoxysilane, 2-cyanoethyltripropoxysilane, 2-cyanoethyldimethoxymethylsilane, 2-cyanoethyldimethoxyethylsilane, 2-cyanoethyldiethoxymethylsilane, 2-cyanoethyldiethyoxyethylsilane, 3-cyanopropyltrimethoxysilane, 3-cyanopropyltriethoxysilane, 3-cyanopropyltripropoxysilane, 3-cyanopropyldimethoxymethylsilane, 3-cyanopropyldimethoxyethylsilane, 3-cyanopropyldiethoxymethylsilane, 3-cyanopropyldiethoxyethylsilane, and the like, or combinations of two or more thereof.

The moisture scavenger is present in the composition in an amount of from about 0.2 wt. % to about 2 wt. %, from about 0.5 wt. % to about 1.75 wt. %, from about 0.75 wt. % to about 1.5 wt. %, or from about 1 wt. % to about 1.25 wt. % based on the total weight of the polymer (a).

The moisture-curable polymer (a) is not particularly limited and can be selected as desired for a particular purpose or intended application. The moisture-curable polymer is a polymer that, upon exposure to moisture, undergoes hydrolysis and subsequent condensation to provide a resin having properties suitable for a particular purpose or intended application. Generally, moisture-curable polymers are suitable for forming a material that is suitable for use as an adhesive, sealant, coating, and the like.

The base structure, repeating unit, or backbone of the polymer is generally not limited and can be selected as desired for a particular purpose or intended application. In one embodiment, the polymer is selected from a polyepoxide, a polyolefin, a polyvinylchloride, a polyester, a polyurethane, a polyamide, a polyfluoroalkene, a polyether, a polyacrylic, a polymethacrylic, and the like that comprises a hydrolysable functional group that renders the polymer reactive upon exposure to moisture.

In one embodiment, the moisture-curable polymer is a polymer resin comprising a hydrolysable silyl group. These may also be referred to as silylated polymers. Examples of suitable silylated polymers include, but are not limited to, silylated polyols, silylated polyethers, silylated polyurethane resins and silane-containing copolymers derived from the copolymerization of one or more ethylenically unsaturated silanes such as vinylsilanes, allylsilanes and methallylsilanes, acryloxyalkylsilane, methacryloxyalkylsilanes and one or more other ethylenically unsaturated monomers such as olefinic hydrocarbons, acrylic acid, methacrylic acid, acrylate ester, methacrylate ester, ethylenically unsaturated dicarboxylic acids and/or their anhydrides, oligomers and/or polymers possessing ethylenic unsaturation, and the like. In one embodiment, the moisture-curable polymer is selected from a silylated polyurethane resin (SPUR). The moisture-curable polyurethane is not particularly limited and can be selected as desired for a particular purpose or intended application.

For silylated resins, the resin can be formed by reacting an appropriate silane functional material with a precursor resin. Such suitable precursor resins will be generally known or determinable by those skilled in the art. In one embodiment, suitable precursor resins include (i) polyether polyols, (ii) polyester polyols, (iii) hydroxyl-terminated polybutadienes, (iv) hydroxyl-terminated and isocyanate-terminated polyurethane prepolymers derived from any of the foregoing, (v) isocyanate-terminated and amine-terminated polyurethane-polyurea (poly(urethane-urea) or polyurethaneurea) prepolymers and polyurea prepolymers derived from polyamines, and (vi) olefinically unsaturated polymers that are capable of undergoing hydrosilation with hydridrosilanes, e.g., polyolefins and polyethers possessing terminal olefinic unsaturation. The resin can be obtained by silylating these and similar precursor resins in any now known or later discovered manner. Some current existing processes for obtaining silylated resins include, e.g., silylating a hydroxyl-terminated resin by reaction with an isocyanatosilane, silylating an isocyanate-terminated resin with a silane possessing functionality that is reactive for isocyanate such as mercapto or amino functionality, and silylating an olefinically unsaturated resin by reaction with a hydridosilane (hydrosilane) under hydrosilation reaction conditions.

In one embodiment, the moisture-curable resin is a silylated SPUR resin such as, but not limited to, those described in U.S. Pat. No. 5,990,257 and can be made by any of the methods described therein, the entire contents of which are incorporated herein by reference in their entirety.

Isocyanate-terminated PUR prepolymers can be obtained by reacting one or more polyols, advantageously, diols, with one or more polyisocyanates, advantageously, diisocyanates, in such proportions that the resulting prepolymers will be terminated with isocyanate. In the case of reacting a diol with a diisocyanate, a molar excess of diisocyanate will be employed.

Included among the polyols that can be utilized for the preparation of the isocyanate-terminated PUR prepolymer are polyether polyols, polyester polyols such as the hydroxyl-terminated polycaprolactones, polyetherester polyols such as those obtained from the reaction of polyether polyol with e-caprolactone, polyesterether polyols such as those obtained from the reaction of hydroxyl-terminated polycaprolactones with one or more alkylene oxides such as ethylene oxide and propylene oxide, hydroxyl-terminated polybutadienes, and the like.

Specific suitable polyols that can be utilized for the preparation of the isocyanate-terminated PUR prepolymer include the poly(oxyalkylene)ether diols (i.e., polyether diols), in particular, the poly(oxyethylene)ether diols, the poly(oxypropylene)ether diols and the poly(oxyethylene-oxypropylene)ether diols, poly(oxyalkylene)ether triols, poly(tetramethylene)ether glycols, polyacetals, polyhydroxy polyacrylates, polyhydroxy polyester amides, polyhydroxy polythioethers, polycaprolactone diols and triols, and the like. In one embodiment of the present invention, the polyols used in the production of the isocyanate-terminated PUR prepolymers are poly(oxyethylene)ether diols with equivalent weights from about 500 to about 25,000. In another embodiment of the present invention, the polyols used in the production of the isocyanate-terminated PUR prepolymers are poly(oxypropylene)ether diols with equivalent weights from about 1,000 to about 20,000. Mixtures of polyols of various structures, molecular weights and/or functionalities can also be used.

The polyether polyols can have a functionality up to about 8 but advantageously have a functionality of from 2 to 4 and more advantageously, a functionality of 2 (i.e., diols). Especially suitable are the polyether polyols prepared in the presence of double-metal cyanide (DMC) catalysts, an alkaline metal hydroxide catalyst, or an alkaline metal alkoxide catalyst; see, for example, U.S. Pat. Nos. 3,829,505, 3,941,849, 4,242,490, 4,335,188, 4,687,851, 4,985,491, 5,096,993, 5,100,997, 5,106,874, 5,116,931, 5,136,010, 5,185,420 and 5,266,681, the entire contents of each of the foregoing patents are incorporated herein by reference in their entireties. In one embodiment, the polyether polyols preferably have a number average molecular weight of from about 1,000 to about 25,000, more preferably from about 2,000 to about 20,000, and even more preferably from about 4,000 to about 18,000. Examples of commercially available diols that are suitable for making the isocyanate-terminated PUR prepolymer include ARCOL R-1819 (number average molecular weight of 8,000), E-2204 (number average molecular weight of 4,000), and ARCOL E-2211 (number average molecular weight of 11,000).

Any of numerous polyisocyanates, advantageously, diisocyanates, and mixtures thereof, can be used to provide the isocyanate-terminated PUR prepolymers. In one embodiment, the polyisocyanate can be diphenylmethane diisocyanate ("MDI"), polymethylene polyphenylisocyanate ("PMIDI"), paraphenylene diisocyanate, naphthylene diisocyanate, liquid carbodiimide-modified MDI and derivatives thereof, isophorone diisocyanate, dicyclohexylmethane-4,4'-diisocyanate, toluene diisocyanate ("TDI"), particularly the 2,6-TDI isomer, as well as various other aliphatic and aromatic polyisocyanates that are well-established in the art, and combinations thereof.

Silylation reactants for reacting with the isocyanate-terminated PUR prepolymers described above include functionality that is reactive with isocyanate and at least one readily hydrolyzable and subsequently crosslinkable group, e.g., alkoxy. Particularly useful silylation reactants are the silanes of the general formula:

$$X-R^6-Si(R^7)_x(OR^8)_{3-x}$$

wherein X is an active hydrogen-containing group that is reactive for isocyanate, e.g., —SH or —NHR$^9$ in which R$^9$ is H, a monovalent hydrocarbon group of up to 8 carbon atoms or —R$^{10}$—Si(R$^{11}$)$_y$(OR$^{12}$)$_{3-y}$, R$^6$ and R$^{10}$ each is the same or different divalent hydrocarbon group of up to 12 carbon atoms, optionally containing one or more heteroatoms, each R$^7$ and R$^{11}$ is the same or different monovalent hydrocarbon group of up to 8 carbon atoms, each R$^8$ and R$^{12}$ is the same or different alkyl group of up to 6 carbon atoms and x and y each, independently, is 0, 1 or 2.

Examples of silanes that can be used as reactants to silylate a resin include, but are not limited to, the mercaptosilanes 2-mercaptoethyl trimethoxysilane, 3-mercaptopropyl trimethoxysilane, 2-mercaptoethyl triethoxysilane, 3-mercaptopropyl triethoxysilane, 2-mercaptoethyl tripropoxysilane, 2-mercaptoethyl tri sec-butoxysilane, 3-mercaptopropyl tri-t-butoxysilane, 3-mercaptopropyl triisopropoxysilane, 3-mercaptopropyl trioctoxysilane, 2-mercaptoethyl tri-2'-ethylhexoxysilane, 2-mercaptoethyl dimethoxy ethoxysilane, 3-mercaptopropyl methoxyethoxypropoxysilane, 3-mercaptopropyl dimethoxy methylsilane, 3-mercaptopropyl methoxy dimethylsilane, 3-mercaptopropyl ethoxy dimethylsilane, 3-mercaptopropyl diethoxy methylsilane, 3-mercaptopropyl cyclohexoxy dimethyl silane, 4-mercaptobutyl trimethoxysilane, 3-mercapto-3-methylpropyltrimethoxysilane, 3-mercapto-3-methylpropyl-tripropoxysilane, 3-mercapto-3-ethylpropyl-dimethoxy methylsilane, 3-mercapto-2-methylpropyl trimethoxysilane, 3-mercapto-2-methylpropyl dimethoxyphenylsilane, 3-mercaptocyclohexyl-trimethoxysilane, 12-mercaptododecyl trimethoxy silane, 12-mercaptododecyl-triethoxy silane, 18-mercaptooctadecyl trimethoxysilane, 18-mercaptooctadecyl methoxydimethylsilane, 2-mercapto-2-methylethyl-tripropoxysilane, 2-mercapto-2-methylethyl-trioctoxysilane, 2-mercaptophenyl trimethoxysilane, 2-mercaptophenyl triethoxysilane, 2-mercaptotolyl trimethoxysilane, 2-mercaptotolyl triethoxysilane, 1-mercaptomethyltolyl trimethoxysilane, 1-mercaptomethyltolyl triethoxysilane, 2-mercaptoethylphenyl trimethoxysilane, 2-mercaptoethyiphenyl triethoxysilane, 2-mercaptoethyltolyl trimethoxysilane, 2-mercaptoethyltolyl triethoxysilane, 3-mercaptopropylphenyl trimethoxysilane and, 3-mercaptopropylphenyl triethoxysilane, and the aminosilanes 3-aminopropyltrimethoxysilane, 3-aminopropyltriethoxysilane, 4-aminobutyltriethoxysilane, N-methyl-3-amino-2-methylpropyltrimethoxysilane, N-ethyl-3-amino-2-methylpropyltrimethoxysilane, N-ethyl-3-amino-2-methylpropyldiethoxymethylsilane, N-ethyl-3-amino-2-methylpropyltriethoxysilane, N-ethyl-3-amino-2-methylpropylmethyldimethoxysilane, N-butyl-3-amino-2-methylpropyltrimethoxysilane, 3-(N-methyl-2-amino-1-methyl-1-ethoxy)-propyltrimethoxysilane, N-ethyl-4-amino-3,3-dimethyl-butyldimethoxymethylsilane, N-ethyl-4-amino-3,3-dimethylbutyltrimethoxy-silane, N-(cyctohexyl)-3-aminopropyltrimethoxysilane, N-(2-aminoethyl)-3-aminopropyitrimethoxysilane, N-(2-aminoethyl)-3-aminopropyltriethoxy-silane, N-(2-aminoethyl)-3-aminopropylmethyldimethoxysilane, aminopropyltriethoxysilane, bis-(3-trimethoxysilyl-2-methylpropyl)amine and N-(3'-trimethoxysilylpropyl)-3-amino-2-methylpropyltrimethoxysilane.

A catalyst will ordinarily be used to prepare the isocyanate-terminated PUR prepolymers. Condensation catalysts are generally employed to prepare the PUR. These catalysts may also catalyze the cure (hydrolysis followed by cross-linking) of the SPUR resin component of the moisture-curable composition. Suitable condensation catalysts include, but are not limited to, the dialkyltin dicarboxylates such as dibutyltin dilaurate and dibutyltin acetate, tertiary amines, the stannous salts of carboxylic acids, such as stannous octoate and stannous acetate, and the like. In one embodiment of the present invention, dibutyltin dilaurate catalyst is used in the production of the PUR prepolymer. Other useful catalysts include zirconium-containing and bismuth-containing complexes such as K-KAT XC6212, K-KAT XC-A209 and K-KAT 348, supplied by King Industries, Inc., aluminum chelates such as the TYZOR® types, available from Dorf Ketal company, and the KR types, available from Kenrich Petrochemical, Inc., and other organometallic catalysts, e.g., those containing a metal such as Zn, Co, Ni, Fe, and the like.

In another embodiment, moisture-curable SPUR resins can be obtained from a hydroxyl-terminated PUR prepolymer. A moisture-curable SPUR resin can, as previously indicated, be prepared by reacting a hydroxyl-terminated PUR prepolymer with an isocyanatosilane. The hydroxyl-terminated PUR prepolymer can be obtained in substantially the same manner employing substantially the same materials, i.e., polyols, polyisocyanates and optional catalysts (preferably condensation catalysts), described above for the preparation of isocyanate-terminated PUR prepolymers. The one major difference in these reactions is that the polyol and polyisocyanate are provided in a ratio that will result in hydroxyl-termination in the resulting prepolymer. Thus, e.g., in the case of a diol and a diisocyanate, a molar excess of the former will be used thereby resulting in hydroxyl-terminated PUR prepolymer.

Useful silylation reactants for the hydroxyl-terminated SPUR resins are those containing isocyanate termination and readily hydrolyzable functionality, e.g., 1 to 3 alkoxy groups. Suitable silylating reactants are the isocyanatosilanes of the general formula:

$$OCN-R^6-Si(R^7)_x(OR^8)_{3-x}$$

wherein $R^6$ is an alkylene group of up to 12 carbon atoms, optionally containing one or more heteroatoms, each $R^7$ is the same or different alkyl or aryl group of up to 8 carbon atoms, each $R^8$ is the same or different alkyl group of up to 6 carbon atoms and x is 0, 1 or 2. In one embodiment, $R^6$ possesses 1 to 4 carbon atoms, each $R^8$ is the same or different methyl, ethyl, propyl or isopropyl group and x is 0.

Specific isocyanatosilanes that can be used to react with hydroxyl-terminated PUR prepolymers to provide moisture-curable SPUR resins include, but are not limited to, isocyanatopropyltrimethoxysilane, isocyanatoisopropyltrimethoxysilane, isocyanato-n-butyltrimethoxysilane, isocyanato-t-butyltrimethoxysilane, isocyanatopropyltriethoxysilane, isocyanatoisopropyltriethoxysilane, isocyanato-n-butyltriethoxysilane, isocyanato-t-butyltriethoxysilane, and the like.

The polymer may, in various embodiments, have a general formula of:

$$R^z-[OC(O)NH-R^6Si(R^7)_x(OR^8)_{3-x}]_y$$

where $R^z$ is an organic polymer fragment, $R^6$, $R^7$, and $R^8$ are as described above, and y is 1 to 6. In one embodiment, the organic polymer fragment is a polymer fragment containing at least one urethane group.

For practical application, the moisture-curable composition may optionally contain additives, such as pigments, fillers, curing catalysts, dyes, plasticizers, thickeners, coupling agents, extenders, volatile organic solvents, wetting agents, tackifiers, crosslinking agents, thermoplastic polymers, and UV stabilizers. The additives may be used in any suitable quantities familiar to a skilled person in the field as may be useful for a particular purpose or intended application.

The catalyst (c) of the moisture-curable composition can be any catalyst that is effective in promoting the reaction between moisture-curable polymer (a) and the reactive modifier (b), which occurs upon exposure to moisture. Suitable cure catalysts include but are not limited to organometallic catalysts, amine catalysts, and the like. Preferably, the catalyst is selected from the group consisting of organic tin compounds, zirconium complex, aluminum chelate, titanic chelate, organic zinc, organic cobalt, organic iron, organic nickel and organobismuth, and mixtures thereof. Amine catalysts are selected from the group consisting of primary amine, secondary amine, tertiary amine and aminosilane and mixtures thereof. The catalyst can be a mixture of organometallic catalyst and amine catalyst.

Representative examples of catalysts include, but are not limited to, dibutyltin oxide, dibutyltin dilaurate, dioctyltin dilaurate, dibutyltin diacetate, stannous octoate, stannous acetate, stannous oxide, morpholine, 3-aminopropyltrimethoxysilane, 2-(aminoethyl)-3-aminopropyltrimethoxysilane, tri-isopropylamine, bis-(2-dimethylaminoethyl) ether and piperazine. Other useful catalysts include zirconium-containing, aluminum-containing and bismuth-containing complexes such as K-KAT™ XC6212, K-KAT™ 5218 and K-KAT™ 348, supplied by King Industries, Inc., titanium chelates such as the TYZOR® types, available from Dorf Ketal, the KR™ types, available from Kenrich Petrochemical, Inc., amines such as NIAX™ A-99 amine, available from Momentive Performance Materials, Inc., and the like.

The catalyst may be present in the moisture-curable composition in an amount of from about 0.05 weight percent to about 5 weight percent based on the total weight of components (a), (b) and (c), preferably in an amount of from about 0.1 weight percent to about 3 weight percent based on the total weight of components (a), (b) and (c) and most preferably, in an amount of from about 0.5 weight percent to about 2 weight percent based on the total weight of components (a), (b) and (c).

Typical fillers suitable for the present moisture-curable resin compositions include, but are not limited to, for example, ground, precipitated and colloidal calcium carbonates which is treated with compounds such as stearate or stearic acid, reinforcing silicas such as fumed silicas, precipitated silicas, silica gels and hydrophobized silicas and silica gels; crushed and ground quartz, alumina, aluminum hydroxide, titanium hydroxide, diatomaceous earth, iron oxide, carbon black and graphite or clays such as kaolin, bentonite or montmorillonite, talc, mica, and the like. In one embodiment of the invention, the amount of filler is from 0.1 weight percent to about 90 weight percent of the total composition. In yet another embodiment of the invention, the amount of filler is from about 5 weight percent to about 60 weight percent of the total composition. In still another embodiment of the invention, the amount of filler is from about 10 weight percent to about 40 weight percent of the total composition. The filler may be a single species or a mixture of two or more species.

The plasticizers customarily employed in the moisture-curable resin composition of the present invention can also be used in the invention to modify the properties and to facilitate use of higher filler levels. Exemplary plasticizers include phthalates, diproplyene and diethylene glycol dibenzoates, alkylsulphonate phenols, alkyl phenathrenes, alkyl/diaryl phosphates and mixtures thereof and the like. The moisture-curable resin composition of the present invention can include various thixotropic or anti-sagging agents. Various castor waxes, fumed silica, treated clays and polyamides typify this class of additives. Stabilizers can be incorporated into the moisture-curable resin composition of this invention include, for example, hindered amine and dialkylhydroxyamine. Adhesion promoters are useful in the moisture-curable composition of the present invention, e.g., alkoxysilane adhesion promoters.

Examples of plasticizers that are suitable for the moisture-curable compositions herein include, but are not limited to phthalates, dipropylene and diethylene glycol dibenzoates and mixtures thereof, epoxidized soybean oil, and the like. Dioctyl and diisodecylphthalate are commercially available under the trade names Jayflex DOP and JayFlex DIDP from Exxon Chemical. The dibenzoates are available as Benzoflex 9-88, Benzoflex 9-88SG, Benzoflex 50 and Benzoflex 400 from Velsicol Chemical Corporation. Epoxidized soybean oil is available from Houghton Chemical Corporation as Flexol EPO. Plasticizer can be present in the moisture-curable composition at a level of from 0 to 50, and preferably from 5 to 15, weight parts per 100 weight parts of the total composition.

Useful solvents include, but are not limited to, aromatic and aliphatic esters and ketones. In one embodiment, the solvent is present in amounts of from about 0.1 to about 20, from about 0.5 to about 5, or from about 1 to about 3 weight parts per 100 weight parts of the total moisture-curable composition of the invention.

In one embodiment, the composition may further include an adhesion promoter. In one embodiment, the adhesion promoter may be a combination blend of n-2-aminoethyl-3-aminopropyltrimethoxysilane and 1,3,5-tris(trimethoxysilylpropyl)isocyanurate. Other adhesion promoters useful in the present invention include but are not limited to n-2-aminoethyl-3-aminopropyltriethoxysilane, γ-aminopropyltriethoxysilane, γ-aminopropyltrimethoxysilane, bis-γ-trimethoxysilypropyl)amine, N-Phenyl-γ-aminopropyltrimethoxysilane, triaminofucticionaltrimethoxysilane, γ-aminopropylmethyldiethoxysilane, γ-aminopropylmethyldiethoxysilane, methacryloxypropyltrimethoxysilane, methylaminopropyltrimethoxysilane, γ-glycidoxypropylethyldimethoxysilane, γ-glycidoxypropyltrimedoxysilane, γ-glycidoxyethyltrimethoxysilane, β-(3,4-epoxycyclohexyl)propyltrimethoxysilane, β-(3,4-epoxycyclohexyl)ethylmethyldimethoxysilane, isocyanatopropyltriethoxysilane, isocyanatopropylmethyldimethoxysilane, β-cyanoethyltrimethoxysilane, γ-acryloxypropyltrimethoxysilane, γ-methacryloxypropylmethyldimethoxysilane, 4l-amino-3,3,-dimethylbutyltrimethoxysilane, and n-ethyl-3-trimethoxysilyl-2-methylpropanamine, and the like.

The adhesion promoter can be added to the composition in ranges of from about 0.1 weight percent to about 20 weight percent. In one embodiment of die invention, the adhesion promoter ranges from about 0.3 weight percent to about 10 weight percent of the total composition. In another embodiment of the invention, the adhesion promoter ranges from about 0.5 weight percent to about 2 weight percent of the total composition.

In another aspect, the present invention also relates to cured compositions produced from curing the aforementioned moisture-curable resin compositions and to sealants, including hot melt sealants, primers, adhesives including hot melt adhesives, and coatings containing such cured compositions. The cured composition of the invention may be produced by contacting a moisture-curable composition with water. As used herein, the term "water" means atmospheric moisture, steam, liquid water, ice or water mixed with other organic compounds, such as organic solvents and is preferably atmospheric moisture. The effective amount of water is that amount sufficient to react with the hydrolysable silyl groups and effect the cure of the composition. Illustratively, the cured compositions include hot melt compositions. The term, "hot melt composition" as used herein, is a solid material at room temperature that melts upon heating for application to a substrate and re-solidifies upon cooling to form a firm bond between the solid material and the substrate. Hot melt compositions include, but are not limited to, hot melt sealants and hot melt adhesives.

The present technology has been described in the foregoing detailed description and with reference to various aspects and embodiments. The technology may be further understood with reference to the following Examples. The Examples are intended to further illustrate aspects and embodiments of the present technology and not necessarily to be limited to such aspects or embodiments.

EXAMPLES

Synthesis Procedure for Silane-Grafted Polymer A

A 1-L 4-neck round bottom flask was equipped with a mechanical stirrer, a thermo couple, a $N_2$ sparging dip leg, and a condenser lined up with a Schlenk line. It was inerted by $N_2$. Polyepoxydiol HMBT120 (500 grams) was charged in to the flask. It was agitated under 40-50 mm Hg with $N_2$ sparging at 80° C. overnight. The temperature was lowered to 70° C. Isophorone diisocyanate (IPDI, 5.1 grams) and dibutyltin dilaurate (DBTDL, 0.011 grams) were added, and the reaction mixture was agitated at 70-75° C. The viscosity of the reaction mixture was measured by a Brookfield DV3THBCJ0 cone and plate viscometer at 25° C. and monitored until it reached about 30,000 cps. 3-Isocyanatopropyltrimethoxysilane (Momentive SILQUEST A-LINK 35 silane, 9.6 grams) was added with agitation. The reaction temperature was elevated to 80-85° C. and the viscosity was monitored again. Methanol (0.4 grams) was added to quench the reaction when the viscosity reached 60,000-70,000 cps. The mixture was agitated for additional 10 min and cooled down, giving a viscous material (silane-grafted Polymer A).

Synthesis Procedure for Silane-Grafted Polymer B

A 1-L 4-neck round bottom flask was equipped with a mechanical stirrer, a thermo couple, a $N_2$ sparging dip leg, and a condenser lined up with a Schlenk line. It was rendered inert by using $N_2$. Polyepoxydiol HMBT80 (500 grams) was charged in to the flask. It was agitated under 40-50 mm Hg with $N_2$ sparging at 80° C. overnight. Isophorone diisocyanate (IPDI, 4.2 grams) and dibutyltin dilaurate (DBTDL, 0.032 grams) were added, and the reaction mixture was agitated at about 80° C. The viscosity of the reaction mixture was monitored at 30-min intervals until it leveled off at about 15,000 cps. 3-Isocyanatopropyltriethoxysilane (Momentive SILQUEST A-LINK 25 silane, 22.1 grams) was added with agitation. The reaction temperature was kept at about 80° C. and the viscosity was monitored again. Ethanol (0.9 grams) was added to quench the reaction when the viscosity leveled off. The mixture was agitated for an additional 10 min and cooled down, giving a viscous material (silane-grafted Polymer B).

Performance Evaluation of Moisture Scavengers in Silane-Grafted Polymers

The performance of the moisture scavengers is evaluated by monitoring the viscosity change of the silane-grafted polymers upon exposure to moisture. In silane-grafted polymers, the hydrolysis of silane-terminals upon exposure to the air/moisture and the subsequent inter-molecular cross-linking leads to the increase of viscosity. A lower viscosity change indicates a better performance of the moisture scavenger that is added to the silane-grafted polymer.

A Typical Sample for the Performance Test was Prepared as Follow:

A silane-grafted Polymer A or Polymer B (10.0-50.0 grams) was placed in a plastic open-top container. A moisture scavenger material as indicated in Table 1 was added to the container in an amount of 0.10-1.0 grams, 2.0 wt % relative to Polymer A or B, and it was mixed well with a speed mixer (FlackTek Speed Mixer, DAC 600.2 VAC-P). The sample was placed in a humidity chamber at 23° C. and 50% relative humidity. The viscosity of the sample was measured periodically at intervals of several days. The viscosities were measured by a Brookfield DV3THBCJ0 cone and plate viscometer at 25° C.

TABLE 1

| Moisture Scavenger ID | Chemical structure/name | Source |
|---|---|---|
| S-1 | Vinyl-Si(OMe)$_3$/(VTMS) | Momentive |
| S-2 | Me—Si(OMe)$_3$/(MTMS) | Momentive |
| S-3 | N≡CCH$_2$CH$_2$—Si(OMe)$_3$ | Momentive |
| S-4 | Pr—Si(OMe)$_3$ | TCI America |

TABLE 1-continued

| Moisture Scavenger ID | Chemical structure/name | Source |
|---|---|---|
| S-5 | Vinyl—Si(OEt)$_3$ | Momentive |
| S-6 | Me—Si(OEt)$_3$ | Momentive |
| S-7 | N≡CCH$_2$CH$_2$—Si(OEt)$_3$ | Momentive |

Moisture scavengers S-3 and S-7 are inventive scavengers. Moisture scavengers S-1, S-2, S-4, S-5, and S-6 are known/conventional scavengers. The test results are summarized in Tables 2, 3, and 4. Examples C1-C10 are comparative examples. Examples E1-E3 correspond to examples in accordance with aspects and embodiments according to the present inventive technology.

TABLE 2

The performance evaluation for moisture scavengers in silane-grafted Polymer A at 23° C./50% RH.

| Experiment type | C1 | C2 | C3 | E1 | C4 |
|---|---|---|---|---|---|
| Moisture scavenger | None | S-1 | S-2 | S-3 | S-4 |
| Silane-grafted polymer | A | A | A | A | A |
| Scavenger/Polymer A (wt %) | 0.0% | 2.0% | 2.0% | 2.0% | 2.0% |
| Viscosity at day 0 of ageing (cps) | 53,530 | 42,590 | 41,690 | 44,920 | 41,180 |
| Viscosity at day 3 of ageing (cps) | 60,010 | 47,720 | 47,250 | 49,000 | 48,800 |
| Viscosity at day 5 of ageing (cps) | 70,730 | 52,120 | 55,790 | 52,120 | 58,250 |
| Viscosity at day 10 of ageing (cps) | 96,990 | 56,810 | 66,150 | 56,810 | 72,020 |
| Viscosity at day 12 of ageing (cps) | 104,200 | 59,350 | 69,490 | 58,250 | 76,170 |
| Viscosity increase in 12 days (cps) | 50,670 | 16,760 | 27,800 | 13,330 | 34,990 |

TABLE 3

The performance evaluation for methoxy moisture scavengers in silane-grafted Polymer B at 23° C./50% RH.

| Experiment type | C5 | C6 | C7 | E2 |
|---|---|---|---|---|
| Moisture scavenger | None | S-1 | S-2 | S-3 |
| Silane-grafted polymer | B | B | B | B |
| Scavenger/Polymer B (wt %) | 0.0% | 2.0% | 2.0% | 2.0% |
| Viscosity at day 0 of ageing (cps) | 18,820 | 14,640 | 14,380 | 15,720 |
| Viscosity at day 4 of ageing (cps) | 20,250 | 17,110 | 17,450 | 18,000 |
| Viscosity at day 7 of ageing (cps) | 21,880 | 17,920 | 17,760 | 18,720 |
| Viscosity at day 11 of ageing (cps) | 23,300 | 18,170 | 18,390 | 19,400 |
| Viscosity at day 14 of ageing (cps) | 23,440 | 18,170 | 18,420 | 19,230 |
| Viscosity at day 21 of ageing (cps) | 25,820 | 18,510 | 18,860 | 19,320 |
| Viscosity at day 28 of ageing (cps) | 27,000 | 18,890 | 19,320 | 20,020 |
| Viscosity change in 28 days (cps) | 8,180 | 4,250 | 4,940 | 4,300 |

TABLE 4

The performance evaluation for ethoxy moisture scavengers in silane-grafted Polymer B at 23° C./50% RH.

| Experiment type | C8 | C9 | C10 | E3 |
|---|---|---|---|---|
| Moisture scavenger | None | S-5 | S-6 | S-7 |
| Silane-grafted polymer | B | B | B | B |
| Scavenger/Polymer B (wt %) | 0.0% | 2.0% | 2.0% | 2.0% |
| Viscosity at day 0 of ageing (cps) | 18,820 | 14,700 | 14,640 | 15,620 |
| Viscosity at day 4 of ageing (cps) | 20,250 | 16,710 | 17,220 | 16,820 |
| Viscosity at day 7 of ageing (cps) | 21,880 | 17,720 | 18,550 | 17,520 |
| Viscosity at day 11 of ageing (cps) | 23,300 | 17,490 | 18,810 | 18,500 |
| Viscosity at day 14 of ageing (cps) | 23,440 | 18,240 | 19,860 | 18,950 |
| Viscosity at day 21 of ageing (cps) | 25,820 | 19,100 | 21,410 | 20,380 |
| Viscosity at day 28 of ageing (cps) | 27,000 | 19,510 | 22,990 | 21,810 |
| Viscosity change in 28 days (cps) | 8,180 | 4,810 | 8,350 | 6,190 |

Procedure for Sealant Formulation Preparation

Masterbatch of Sealant Material without Moisture Scavenger:

Momentive SPUR+ 1015 prepolymer (688.2 grams), BASF Tinuvin® 213 UV absorber (6.9 grams), and BASF Tinuvin® 765 light stabilizer (6.9 grams) are mixed for 10 minutes in a Ross mixer at low vacuum. Then diisodecyl phthalate (DTDP, 543.0 grams), precipitated calcium carbonate (PCC, 990.0 grams), ground calcium carbonate (GCC, 660.0 grams), titanium dioxide (34.5 grams), and fumed silica (Cabot TS 720, 34.5 grams) were added step by step, and the mixture was mixed at high speed for 1-2 hours until the particles were well dispersed. It was cooled down to room temperature, affording about 2900 grams of masterbatch of sealant material.

Sealant Formulation with a Moisture Scavenger

The above masterbatch of sealant material (167.96 grams) was charged in a plastic cup. Momentive SILQUEST A-1120J silane (0.97 grams) was added, and it was mixed under vacuum with a speed mixer. It was then cooled to about 30° C. Catalyst Fomrez® SUL-4 (DBTDL, 102 mg)

and a moisture scavenger candidate (1.02 grams, selected ones from table 1) was added to the mixture, and it was mixed for 1 more min. The samples with different moisture scavengers were prepared and tested in parallel. Their performance was included in Table 5.

Mechanical Properties

A sealant formulation with a moisture scavenger was cast into a film and cured in a humidity chamber at 23° C. and 50% humidity for 7 days. Tensile properties were tested according to ASTM D412, and hardness was tested under ASTM C661. The test results are listed in Table 5.

Skin-Over-Time Measurement

A sealant formulation with a moisture scavenger was poured into an aluminum weighing pan, and it was immediately placed in a humidity chamber. The skin-over-time was evaluated by using a wooden splint to touch the surface of the sample and lifting at intervals of a couple of minutes. The skin-over-time was determined when no material was lifted by the wooden splint. The results are summarized in Table 5.

Extrusion Rate Measurement

A sealant formulation with a moisture scavenger was packaged into a plastic cartridge. The initial extrusion rate was measured by extruding it through a nozzle with the diameter of (1/8)". The cartridge was then sealed/capped well. It was aged at 50° C. for 2 weeks, and the extrusion rate was measured again. It was then again sealed and aged at 50° C. for additional 2 weeks (4 weeks in total), and the final extrusion rate was measured for the last time. The extrusion rate was calculated by dividing the weight of extruded material by the time. If a material fully cured in the cartridge and was not extrudable anymore, the "0" extrusion rate was given as the result. The results are compiled in Table 5. Examples C11 and C12 are comparative examples. Example E4 is an inventive example.

TABLE 5

Performance evaluation for moisture scavengers in sealant formulations.

| Experiment type | C11 | C12 | E4 |
| --- | --- | --- | --- |
| Moisture scavenger | S-1 | S-2 | S-3 |
| Moisture scavenger name | VTMS | MTMS | 2-cyanoethyl-Si(OCH$_3$)$_3$ |
| Moisture scavenger, wt % | 0.6% | 0.6% | 0.6% |
| Skin-Over-Time, test 1 (min) | 24.0 | 21.0 | 71.0 |
| Skin-Over-Time, test 2 (min) | 15.0 | 24.0 | 105.0 |
| Skin-Over-Time, average (min) | 19.5 | 22.5 | 88.0 |
| Mechanical Properties | | | |
| Modulus (automatic) (psi) | 179.6 | 199.3 | 161.7 |
| Modulus @ 100% E (psi) | 153.5 | 158.7 | 145.7 |
| Tensile stress at Break (standard) (psi) | 201.1 | 195.2 | 198.5 |
| Elongation (%) | 243.7 | 204.8 | 277.8 |
| Hardness (Shore A) | 40.0 | 44.0 | 40.0 |
| Extrusion Rate | | | |
| Extrusion rate at day 0 (grams/sec) | 1.450 | 0.827 | 1.272 |
| Extrusion rate at day 14 (grams/sec) | 0.189 | 0.262 | 0.169 |
| Extrusion rate at day 28 (grams/sec) | 0.118 | 0.140 | 0.082 |

The results in Table 2 show that adding any of these moisture scavengers help slow down the viscosity increase. On the other hand, S-3 and S-1, as moisture scavengers, perform comparably, with S-3 slightly overperforming S-1. But they stabilize silane-grafted Polymer A more effectively than S-2 and S-4.

The tests of moisture scavengers in Table 3 compare the performance of S-1, S-2, and S-3 in Polymer B that is ethoxysilane-grafted. The comparison also confirms that S-3 acts comparably to S-1 in such an application of stabilizing the polymer, and they are an improvement over S-2. These experimental results also indicate that methoxysilane moisture scavengers (S-1/-2/-3) are very effective in ethoxysilane-grafted polymers.

The ethoxy analogs of S-1, S-2, and S-3 are S-5, S-6, and S-7, respectively. The performance of these ethoxy moisture scavengers was evaluated as well in ethoxysilane-grafted Polymer B. Table 4 summarizes their performance as drying agents. Moisture scavengers S-5, 5-6, and S-7 are relatively less effective compared to their methoxy counterparts (in Table 3), but they still have the effect of slowing down the viscosity change.

On the basis of the superior stabilizing capability of S-1, S-2, and S-3 as moisture scavengers in silane-grafted polymers, they were further evaluated in sealant formulations, which are shown in Table 5.

The results in Table 5 show that S-3 has the longest skin-over-time among these candidates. This indicates a strong water absorbing capability in the formulation that can provide a long pot life. It allows the formulator to have more room tuning the formulation and adjusting the pot life to the desired range. The two conventional scavengers (S-1 and S-2) and the scavenger S-3 in accordance with the present technology displayed similar performance in terms of the mechanical properties and hardness of corresponding sealant formulations, as shown in Table 5.

The extrusion rate upon ageing is a way of evaluating the shelf life of a sealant formulation. The silane candidates were also tested as moisture scavengers to extend the sealant shelf life. The experimental data are shown in Table 5. S-1, S-2, and S-3 were able to provide reasonable flowability, gunnability, and extrudability.

The performance tests show that the present cyanoalkylalkoxysilanse are similar or better moisture scavengers compared to conventional moisture scavengers. They are superior drying agents than other silanes (e.g. propyltrimethoxysilane, etc.). On the other hand, the cyanoalkylalkoxysilanes are generally considered a more viable alternative as they are not considered to be a skin-sensitizer nor a flammable material as compared to more common trialkoxysilanes.

The combination of the two benefits, i.e. the demonstrated effectiveness as a moisture scavenger and their safety profile, makes cyanoalkylalkoxysilanes a very desirable moisture scavenger for polymers, elastomers, resins, adhesives, sealants, coatings, and for filler treatment, and so forth.

What has been described above includes examples of the present specification. It is, of course, not possible to describe every conceivable combination of components or methodologies for purposes of describing the present specification, but one of ordinary skill in the art may recognize that many further combinations and permutations of the present specification are possible. Accordingly, the present specification is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

The foregoing description identifies various, non-limiting embodiments of a moisture curable composition with a cyanoalkylalkoxysilane moisture scavenger. Modifications may occur to those skilled in the art and to those who may make and use the invention. The disclosed embodiments are merely for illustrative purposes and not intended to limit the scope of the invention or the subject matter set forth in the claims.

What is claimed is:

1. A moisture-curable composition comprising:
   (a) a moisture-curable resin comprising a polymer that is reactive with water, wherein the moisture-curable resin (a) is selected from a silylated polyol; a silylated polyether; a silylated polyurethane; a silane-containing copolymer derived from the copolymerization of an ethylenically unsaturated silane selected from a vinylsilane, an allylsilane, a methallylsilane, an acryloxyalkylsilane, a methacryloxyalkylsilane, and an ethylenically unsaturated monomer selected from an olefinic hydrocarbon, an acrylic acid, a methacrylic acid, an acrylate ester, a methacrylate ester, an ethylenically unsaturated dicarboxylic acid, and/or an anhydride of the ethylenically unsaturated monomer, oligomers, and/or a polymer possessing ethylenic unsaturation; a combination of two or more thereof; and
   (b) a moisture scavenger selected from a cyanoalkylalkoxysilane.

2. The moisture-curable composition of claim 1, wherein the cyanoalkylalkoxysilane is of the formula:

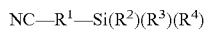

where $R^1$ is selected from a C1-C20 bivalent hydrocarbon group; $R^2$, $R^3$, and $R^4$ are each independently selected from C1-30 monovalent hydrocarbon, a halide, and —$OR^5$, where $R^5$ is independently selected from a C1-30 monovalent hydrocarbon, with the proviso that at least one of $R^2$, $R^3$, and $R^4$ is selected from —$OR^5$.

3. The moisture-curable composition of claim 2, wherein $R^1$ is selected from a C1-20 alkylene; $R^2$, $R^3$, and $R^4$ are each independently selected from a C1-20 alkyl, a C4-C20 cycloalkyl, and a C6-C30 aryl, and —$OR^5$ with the proviso that at least one of $R^2$, $R^3$, and $R^4$ is selected from —$OR^5$; and $R^5$ is independently selected from a C1-20 alkyl.

4. The moisture-curable composition of claim 2, wherein $R^1$ is selected from a C1-20 alkylene; each of $R^2$, $R^3$, and $R^4$ is selected from a C1-C10 alkyl, and —$OR^5$ with the proviso that at least one of $R^2$, $R^3$, and $R^4$ is selected from —$OR^5$, and $R^5$ is selected from a C1-C10 alkyl.

5. The moisture-curable composition of claim 2, wherein $R^1$ is selected from a C1-C4 alkylene, and each of $R^2$, $R^3$, and $R^4$ is selected from —$OR^5$, where $R^5$ is independently selected from a C1-C4 alkyl.

6. The moisture-curable composition of claim 1, wherein the cyanoalkylalkoxysilane is selected from 2-cyanoethyltrimethoxysilane, 2-cyanoethyltriethoxysilane, 2-cyanoethyltripropoxysilane, 2-cyanoethyldimethoxymethylsilane, 2-cyanoethyldimethoxyethyl silane, 2-cyanoethyldiethoxymethyl silane, 2-cyanoethyldiethyoxyethyl silane, 3-cyanopropyltrimethoxysilane, 3-cyanopropyltriethoxysilane, 3-cyanopropyltripropoxysilane, 3-cyanopropyldimethoxymethyl silane, 3-cyanopropyldimethoxyethyl silane, 3-cyanodiethoxymethyl silane, 3-cyanopropyldiethoxyethylsilane, or a combination of two or more thereof.

7. The moisture-curable composition of claim 1, wherein the cyanoalkylsiloxane is present in an amount of from about 0.1 wt. % to about 20 wt. % based on the total weight of the moisture-curable resin (a).

8. The moisture-curable composition of claim 1, wherein the cyanoalkylsilane is present in an amount of from about 0.5 wt. % to about 10 wt. % based on the total weight of the moisture-curable resin (a).

9. The moisture-curable composition of claim 1, wherein the moisture curable resin comprises a hydrolysable silyl group.

10. The moisture-curable composition of claim 2, wherein the moisture-curable resin (a) is selected from a silylated polyurethane.

11. The moisture-curable composition of claim 10, wherein the silylated polyurethane is selected from a polymer of the formula:

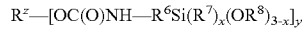

where $R^1$ is an organic polymer fragment, $R^6$ is an alkylene group of up to 12 carbon atoms, optionally containing one or more heteroatoms, each $R^7$ is the same or different alkyl or aryl group of up to 8 carbon atoms, each $R^8$ is the same or different alkyl group of up to 6 carbon atoms, x is 0, 1 or 2, and y is 1 to 6.

12. The moisture-curable composition of claim 10, wherein $R^1$ is selected from a C1-C20 linear or branched bivalent hydrocarbon group; $R^2$, $R^3$, and $R^4$ are each independently selected from a C1-C10 alkyl; where $R^5$ is selected from a C1-C10 alkyl.

13. The moisture-curable composition of claim 10, wherein each of $R^2$, $R^3$, and $R^4$ is selected from a C1-C20 alkyl, a C4-C20 cycloalkyl, a C6-C30 aryl, or —$OR^5$.

14. The moisture-curable composition of claim 10, wherein $R^1$ is selected from a C1-C20 linear or branched bivalent hydrocarbon group, and each of $R^2$, $R^3$, and $R^4$ is selected from —$OR^5$, where $R^5$ is independently selected from a C1-C4 alkyl.

15. The moisture-curable composition of claim 1, wherein the composition further comprises an additive selected from a pigment, a filler, a curing catalyst, a dye, a plasticizer, a thickener, a coupling agent, an extender, a solvent, a wetting agent, a tackifiers, a crosslinking agent, a thermoplastic polymer, an adhesion promoter, a UV stabilizer, or a combination of two or more thereof.

16. The moisture-curable composition of claim 1, wherein the composition further comprises a catalyst that catalyzes the reaction of the moisture-curable resin (a) with water under curing conditions.

17. A cured composition produced by contacting the composition of claim 1 with water.

18. A moisture-curable sealant, adhesive or coating containing the moisture-curable resin composition of claim 1.

19. A method of forming a cured composition comprising contacting the composition of claim 1 with water.

20. A method of treating a substrate comprising applying a moisture-curable composition of claim 1 to a surface of the substrate.

* * * * *